May 4, 1943.                P. H. BRACE                2,318,051
                 COUPLING BETWEEN SHAFTS AND WHEELS
                       Filed March 12, 1942
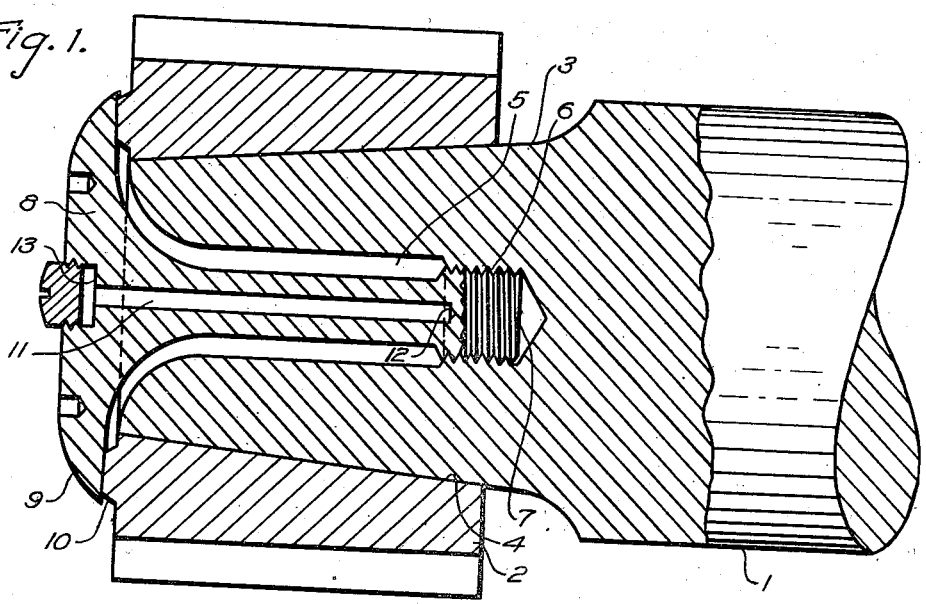
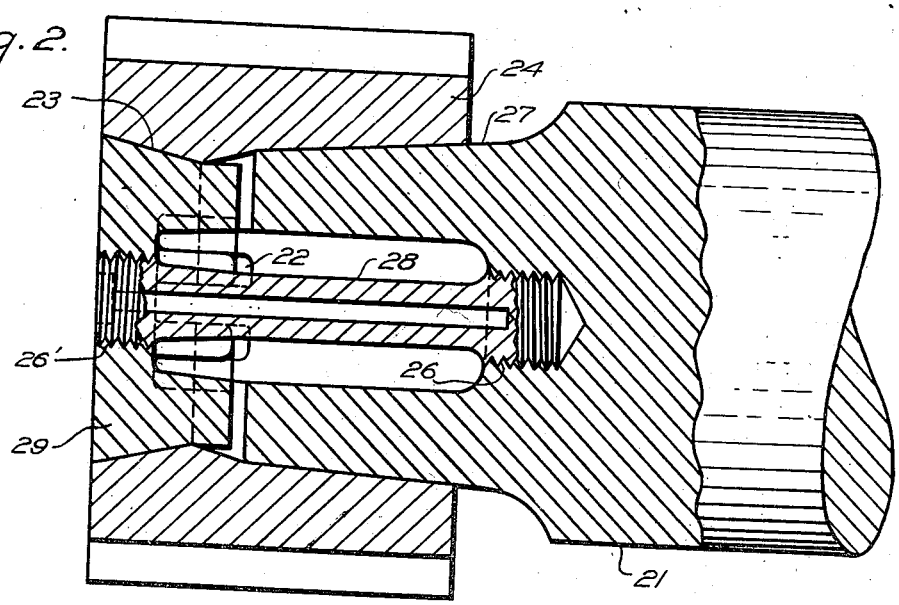
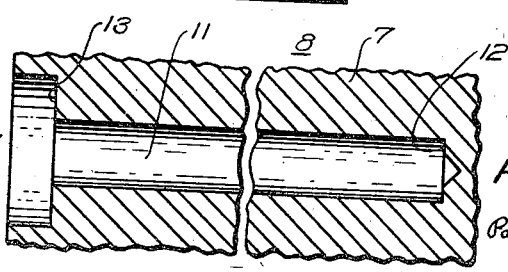
WITNESSES:
INVENTOR
Porter H. Brace.
BY
ATTORNEY Patented May 4, 1943

2,318,051

UNITED STATES PATENT OFFICE 2,318,051

COUPLING BETWEEN SHAFTS AND WHEELS

Porter H. Brace, Forest Hills, Pa., assignor to Westinghouse Electric & Manufacturing Company, East Pittsburgh, Pa., a corporation of Pennsylvania Application March 12, 1942, Serial No. 434,306

8 Claims. (Cl. 287—53)

My invention relates to couplings between a wheel, cam, or other element, and a shaft, and more particularly to coupling means between gear wheels and shafts.

In attaching wheels, gears, cams, pinions, crank-levers, or other machine elements to shafts resort is often had to shrink fits. One application where this type of connection is usually used is in the fastening of pinions to motor shafts in electric locomotives.

In this mentioned example, which is merely illustrative, the end of the motor shaft may be tapered at its end by, say, one and one-half inches per foot of axial length of the shaft and the pinion, which is provided with an accurate corresponding taper, is shrink-fitted to the shaft. This is usually done by heating the pinion to a relatively high temperature, say about 175° C., and then while the pinion is hot it is snugly fitted in proper position on the tapered end of the shaft. After the pinion cools, the pinion will hug the shaft so tightly that it may be operated without a retaining nut on the end of the shaft.

However, if as the result of frequent overloads on the shaft, reversing torques on the shaft, or the cumulative effects of elastic distortions of the shaft or the pinion or both the pinions become slightly loosened, it is at once free to slide off the shaft leaving the motor free.

In railway drives series motors are usually in use. A series motor if freed of its restraining torque, that is, unloaded, while remaining connected to the source of power speeds up until the winding bursts. The disadvantages of such an occurrence are obvious.

The usual lock-nut is bulky if thick enough to be reliable and the space requirements as a rule do not permit of its use. Further, in reversing service such a nut is always subject to torques tending to work it off. Keys, on the other hand, are avoided because they weaken both the pinion and the shaft at regions where any weakening is most detrimental.

One object of my invention is to eliminate the mentioned disadvantages in a coupling between a shaft and a torque transmitting member mounted thereon.

Another object of my invention is the provision of a compact and rigid coupling between a shaft and a machine element mounted thereon.

A more specific object of my invention is an improved type of shrink-fit coupling between a shaft and an element mounted thereon.

Other objects and advantages will become more apparent from a study of the following specification and the accompanying drawing, in which:

Figure 1 shows a longitudinal sectional view of a preferred embodiment of my invention;

Fig. 2 is a similar sectional view of a modification of my invention; and

Fig. 3 is an enlarged sectional view of a detail of my invention.

Referring to Fig. 1 of the drawing, 1 designates a shaft by means of which torques, from a suitable motor, or engine or other mover, are to be transmitted to the pinion 2. The shaft is provided with a substantially conventional type of taper as shown at 3. The pinion is provided with a taper 4 corresponding to the taper 3 of the shaft. The pinion, or other machine element, is shrink-fitted to the shaft in the conventional manner.

The end of the shaft is, however, provided with an axial hole 5 provided with threads 6 at the bottom to receive the threaded end of the stem 7 of the mushroom-shaped tension member 8 as shown.

The hole in the end of the shaft being an axial opening does not materially affect the strength of the shaft. The depth of this hole 5 may be relatively small but preferably needs to be no deeper than about one and one-half to two times the shaft diameter at the tapered end of the shaft.

The lower surface of the hood portion 9 of mushroom-shaped member engages an annular projection 10 on the pinion and in operation the member 8 is so assembled with the end of the shaft that the stem 7 is under considerable tension, whereby a considerable pressure is exerted on the pinion 2 at region, or projection 10 to thus force the pinion more and more firmly on the taper of the shaft.

In practice, the tension in stem 7 may be obtained as follows. After the pinion 2 is shrink-fitted on the end of the shaft and the assembly has cooled the mushroom-shaped member 8 is heated to about 200° C. and while thus in a heated state is firmly screwed against the pinion 2. As the member 8 cools, the tension in stem 7 rises causing 7 to act as a spring urging the pinion onto the shaft taper.

For example, a five inch shaft might be drilled to receive a tension member having a stem with a diameter of one and one-half inches. Introducing the stem 7 into the hole 5 at 200° C. might be expected to give it an effective temperature of 175° C., or a differential between stem and shaft of, say, 150° C. by the time the tension member has been screwed into place with the hood portion of member 8 snugly against the outboard face of the pinion.

When all the parts have cooled the stress in the stem 7 might be approximately fifty thousand pounds per square inch, which, for a stem having a diameter of one and one-half inch would be about eighty-eight thousand pounds pressure, or a pressure of 44 tons on the pinion counteracting any tendency for the pinion to escape.

Moreover, since the stem of 8 has considerable torsional flexibility the threaded end is substantially free from the forces tending to work a nut loose.

A further advantage would be the ability of the relatively long resilient tension member to follow up some small creep of the pinion such as might result from some relaxation of the shrink stress in the pinion such as due to overload or abnormally high internal stresses remaining after heat treatment.

In order to facilitate removal of the tension member, as when replacement of the pinion becomes necessary, I provide the member 8 with an axial hole 11 into which may be inserted an electric heating unit or other source of heat such as a jet of hot air to quickly heat the stem and relax the contraction stresses. Then the member 8 may be unscrewed with little difficulty.

As a means of verifying the retaining force being exerted by the tension member while in service, I may finish the bottom of hole 11 with a fiducial surface 12 and provide the outer end of the stem with another fiduciary surface 13. With these two fiduciary surfaces as bases the elongation of the stem under stress, when in position and cool, can be measured and the stress in pounds or tons deduced from knowledge of the original dimension when cold and free from stress, the elastic modulus and the cross sectional area of 8. Such measurements might also serve to indicate the temperature of the stem and thus guide assembly procedures.

The material of member 8 may be steel or any suitable alloy having high temperature coefficients of expansion and having high strength. Alloys known as 18–8 and K–42–B are suitable for this service.

The K–42–B alloy especially provides greater expansion, longer stretch, better follow-up and is less susceptible to impairment of elastic properties by the heating incident to assembly.

The effectiveness of the tension member is dependent upon its ability to maintain high stresses for considerable periods of time. I propose to enhance the effective elastic range of the tension member by pre-stressing it in tension to some point slightly beyond its elastic limit, and thereafter subject it to a low temperature anneal for some hours. By this process proportional limits in tension may be raised to 150,000 pounds per square inch or more thus providing a large margin over and above the working stresses of the order of 50,000 to 75,000 pounds per square inch that would be adequate in many cases.

While I show the tension member 8 screwed into the bottom of hole 5 in the shaft, it is clear that the shaft may be a hollow shaft, that is, bored from end to end, and the tension member threaded into a separate nut or disc at the end of the shaft opposite the pinion.

In Fig. 1 I show the hood portion of member 8 integral with the stem. The head, or hood, portion may, however, be threaded to the stem somewhat as shown in Fig. 2.

For those situations requiring the utmost economy of over-all length of the pinion shaft, I propose the arrangement shown in Fig. 2. In this modification the tension member 28 is threaded on both ends, left hand on one end and right hand on the other, or differentially threaded, if desired, and engages the shaft 21 at one end, as at 26, and a slotted tapered plug 29 at the other end as at 26'. This plug 29 engages the slotted end portion 22 of the shaft 21 as well as the tapered portion 23 of pinion 24.

In use, the pinion 24 may be heated and put over the tapered portion 27 of the shaft by shrink-fitting. The tension member while hot is then screwed into the end of the shaft and the plug to thus draw the plug firmly into the tapered portion of the pinion. The slotted faces of the plug and the end of the shaft are thus also brought into cooperative relation so that there can be no relative rotation between the plug and the shaft.

After the tension member cools, it applies a strong force on the plug thus forcing the pinion even tighter on the shaft and also on the plug.

While I have mentioned heating as a means for temporarily lengthening the tension member to allow easy engagement of the threaded portions, I also propose to stretch it elastically, as by means of a portable hydraulic jack, screw the outer nut into place and thereafter release the initial load.

The specific features herein disclosed are merely examples of certain embodiments. My invention may, of course, take various forms including broadly a pre-stressed member serving to hold a driving member, a motor shaft for example, in forcible working engagement with the driven member, a pinion, for instance.

I claim as my invention:

1. A connection between a shaft and a pinion, in combination, a driving shaft having a tapered end, a pinion having a corresponding inner taper shrunk-fit on the tapered end of the shaft, said shaft having an axial hole at the tapered end, a tension member having an inner end rigidly connected to the shaft at the bottom of the hole and having an outer end provided with means for engaging the pinion, said tension member being mounted to be under relatively high tension to thus act on the pinion to force it on the taper of the shaft, said tension member being provided with a relatively small axial opening and spaced surfaces at the walls of the opening, whereby the tension member may be heated from the inside and also measurements of the spacing of the surfaces may be made from which to deduce the tension in the tension member.

2. In a construction for rigidly interconnecting two machine elements, in combination, a cylindrical machine element having a tapered end, an annular machine element having an inner corresponding tapered surface to thus fit over the taper on the end of the cylindrical machine, and an elongated member connected to the tapered end of the cylindrical machine element and having means for engaging the outer surface of the annular machine element, said elongated member being mounted under tension to thus continuously act on the annular element to force it more firmly on the tapered end of the cylindrical member, said elongated member being provided with an axial channel whereby the elongated member may be heated from the inside to alter its internal stress, or tension.

3. In a construction for rigidly interconnecting two machine elements, in combination, a cylindrical machine element having a tapered end, an annular machine element having an inner corresponding tapered surface to thus fit over the taper on the end of the cylindrical machine, and an elongated member connected to the tapered end of the cylindrical machine element and having means for engaging the outer surface of the annular machine element, said elongated member being mounted under tension to thus continuously act on the annular element to force it more firmly on the tapered end of the cylindrical member, said elongated member being provided with an axial channel whereby measurements between known points on the walls of the channel may be taken to determine the tension in the elongated member.

4. A coupling between a driving shaft and an element mounted thereon to be driven by the shaft, in combination, a shaft having a tapered end, an element shrunk-fit on the tapered end, a tension member connected to the tapered end of the shaft, said tension member being provided with means for engaging the element and being so mounted as to be subject to considerable tension whereby the tension mamber acts upon the element to more firmly force the element on the taper of the tapered end of the shaft, said tension member being provided with an axial channel for performing operations such as heating, inspecting, or measuring, on said member from said channel.

5. A connection between a shaft and a pinion, in combination, a driving shaft having a tapered end, a pinion having a corresponding inner taper for a portion of its axial length and an inner taper opposite in sense for a portion of its axial length at the other, or outer end shrunk-fit on the tapered end of the shaft, said shaft having an axial hole at the tapered end, a tension member having an inner end rigidly secured to the shaft at the bottom of the hole and having a threaded outer end, a generally cylindrical plug threaded on the threads of the outer end, said plug having an outer taper corresponding to the inner taper of the pinion at its outer end whereby said tension member, which is positioned in place under considerable tension, thus acts to force the pinion on the tapers of the shaft and plug.

6. A connection between a shaft and a pinion, in combination, a driving shaft having a tapered end, a pinion having a corresponding inner taper for a portion of its axial length and an inner taper opposite in sense for a portion of its axial length at the other, or outer, end shrunk-fit on the tapered end of the shaft, said shaft having an axial hole at the tapered end and having radial slots in the end face of the tapered end, a tension member having an inner end rigidly secured to the shaft at the bottom of the hole and having a threaded outer end, a generally cylindrical plug threaded on the threads of the outer end, said plug having an outer taper corresponding to the inner taper of the pinion at its outer end and radial projections on the inner end face of the plug fitting in the radial slots in the end face of the tapered end of the shaft, whereby said tension member, which is positioned in place under considerable tension, thus acts to force the pinion on the tapers of the shaft and plug.

7. In a connection between a shaft and an element to be rigidly mounted thereon, in combination, a shaft having a tapered end and an axial opening, an element having a corresponding taper shrunk-fit on the tapered end of the shaft, and means for maintaining the tapered portions of said shaft and element engaged comprising an elongated tension member having shoulder portions at one end, the other end of said member being receivable in said opening, means for securing said other end to said shaft at the bottom of said opening with said shoulder portions engaged with said element when said member is at a temperature higher than said shaft, cooling of said member to the temperature of said shaft being effective to stress said member in tension, the tension force thus imparted to said member being transmitted through said shoulder portions to said element for holding said element more firmly engaged with said shaft.

8. In a connection between a shaft and an element to be rigidly mounted thereon, in combination, a shaft having an axial opening, an element mounted on said shaft, said element and shaft having abutting surfaces limiting inward movement of said element with respect to said shaft, and means for maintaining said surfaces engaged comprising an elongated tension member having shoulder portions at one end, the other end of said member being receivable in said opening, means for securing said other end to said shaft at the bottom of said opening with said shoulder portions engaged with said element when said member is at a temperature higher than said shaft, cooling of said member to the temperature of said shaft being effective to stress said member in tension, the tension force thus imparted to said member being transmitted through said shoulder portions to said element for holding said element more firmly engaged with said shaft.

PORTER H. BRACE.